United States Patent [19]
Dorenbosch

[11] Patent Number: 6,044,252
[45] Date of Patent: Mar. 28, 2000

[54] METHOD AND APPARATUS FOR SWITCHING BETWEEN OPERATING CHANNELS WITH DIFFERENT TIME REFERENCES

[75] Inventor: Jheroen Pieter Dorenbosch, Paradise, Tex.

[73] Assignee: Motorola, Inc., Schaumburg, Ill.

[21] Appl. No.: 08/978,938

[22] Filed: Nov. 26, 1997

[51] Int. Cl.⁷ ..................................................... H04B 1/16
[52] U.S. Cl. ...................... 455/161.1; 455/432; 455/455; 455/516; 455/552
[58] Field of Search .............................. 455/161.1, 161.2, 455/67.1, 432, 434, 436, 440, 443, 455, 62, 515, 516, 502, 552, 553, 38.3; 370/329, 330, 341

[56] References Cited

U.S. PATENT DOCUMENTS

| | | | |
|---|---|---|---|
| 5,119,397 | 6/1992 | Dahlin et al. | 455/32.1 |
| 5,661,724 | 8/1997 | Chennakeshu et al. | 370/324 |
| 5,761,618 | 6/1998 | Lynch et al. | 455/419 |

*Primary Examiner*—Lee Nguyen
*Attorney, Agent, or Firm*—Charles W. Bethards

[57] ABSTRACT

A selective messaging unit (117), and analogous method, arranged to reduce switching latency between operating channels that are scheduled in accordance with different time references, the unit including: a receiver (403) for monitoring a first operating channel (115) scheduled in accordance with a first time reference; a controller (405), coupled to the receiver, for providing an indication corresponding to a second time reference; and for controlling the receiver to scan for a second operating channel (125) that is scheduled in accordance with the second time reference.

28 Claims, 4 Drawing Sheets

METHOD AND APPARATUS FOR SWITCHING BETWEEN OPERATING CHANNELS WITH DIFFERENT TIME REFERENCES

FIELD OF THE INVENTION

The present invention concerns communications systems having operating channels scheduled in accordance with different time references and more particularly but not limited to selective messaging systems, units, and methods for switching between such operating channels with minimal latency.

BACKGROUND OF THE INVENTION

Communications systems and more specifically selective messaging systems and units or receivers are known. Such selective messaging systems having scheduled operating channels are also known. A scheduled operating channel requires a time reference for the channel that is known to the system and known within specified limits to units operating on the system. Such scheduled operating channels allow the system and units to coordinate activity so as to balance channel activity while allowing individual units to remain inactive or asleep much of the time. This inactive or sleep state allows the selective messaging units (SMUs) to conserve power or battery resources.

However the SMU can utilize significant battery power when searching for a channel prior to the time reference for the channel being determined. Alternatively battery power can be preserved to some extent at the cost of large delays in locating and locking to a channel. Various strategies have been developed that largely trade latency for battery resources during this search however none have been satisfactory at addressing both requirements.

Present selective messaging systems have added an additional degree of complexity commonly referred to as roaming wherein a given SMU can be required to roam from one area or system to another area served by another system. The different system often have different operating channels that are scheduled according to a different time references. The SMU will need to lock to these different operating channels as the SMU roams from area to area. Clearly a need exists for apparatus and methods that allow selective messaging units to switch operating channels having different time references with minimal latency and battery consumption.

BRIEF DESCRIPTION OF THE DRAWINGS

The features of the present invention that are believed to be novel are set forth with particularity in the appended claims. However, the invention together with further advantages thereof, may best be understood by reference to the accompanying drawings wherein:

DETAILED DESCRIPTION OF THE PREFERRED EMBODIMENT

The present invention relates to messaging systems having operating channels that are scheduled according to different time references. SMUs operating in these systems will be required to switch between these operating channels with minimal latency and battery consumption. A preferred embodiment of a selective messaging unit that is arranged to reduce switching latency between operating channels that are scheduled in accordance with different time references includes a receiver for monitoring a first operating channel scheduled in accordance with a first time reference, a controller, coupled to the receiver for providing an indication corresponding to a second time reference; and for controlling the receiver so as to scan for a second operating channel that is scheduled in accordance with the second time reference.

More particularly the selective messaging unit is required to switch from monitoring the first operating channel scheduled in accordance with a Global Positioning System (GPS) reference to a second operating channel scheduled in accordance with a Universal Time Coordinated (UTC) reference and vice-a-versa. The UTC reference or local time reference will vary by a few seconds from a GPS reference where the variation depends on variations in the rotation of the earth (from an integer number of hours and minutes and etc.).

When going from a GPS to UTC referenced channel the indication can correspond to local time, a system description, or an operating parameter such as frequency, all as preferably, read or decoded from the operating channel being monitored. Alternatively a memory storing a look up table value and associated date within the SMU will be used to provide or initiate the indication of a neighboring operating channel scheduled with a different reference and particularly the amount of variation between the references. When going from a UTC to a GPS referenced channel the indication can correspond to a system description or operating parameter read from the channel being monitored or the stored look up value and date indicating the amount of variation. In any event the controller will determine an offset or time difference between the references. For example when going from GPS to UTC the offset will correspond to the indication where it is local time and a cycle time associated with the second operating channel. In this instance the offset will be the remainder of a division of the local time by the cycle time for the second operating channels protocol. An analogous method is further explained below.

Figure 1:
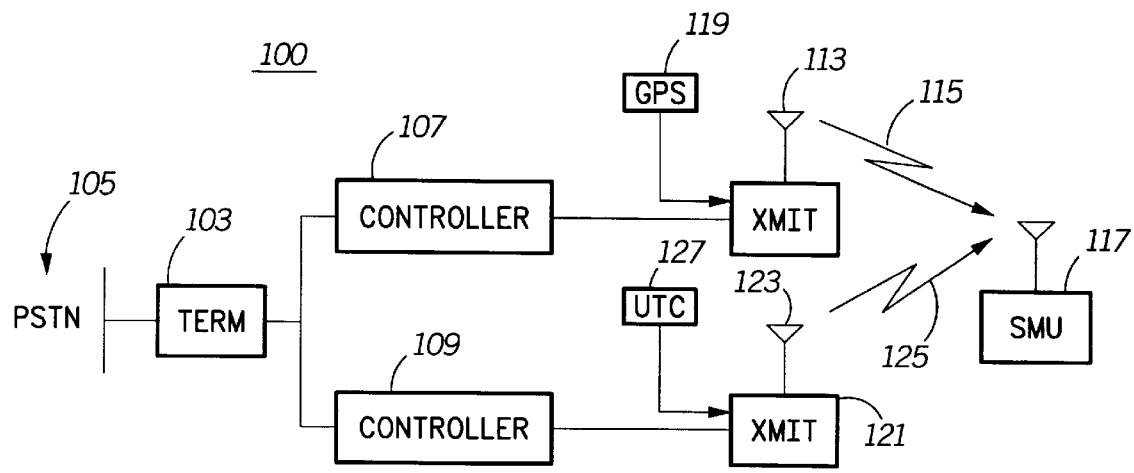
FIG. 1 is a block diagram of a selective messaging system in accordance with the instant invention.

Referring to the FIG. 1 block diagram a representative selective messaging system (100) will be described. The selective messaging system includes a terminal such as the WMG™ product from Motorola, coupled to a message source such as the Public Switched Telephone Network (PSTN) (105). The terminal is further coupled to controllers (107, 109), such as the RFC!™ product available from Motorola and operates to couple messages from the PSTN to the proper or appropriate controller. Here each controller represents a different messaging system or subsystem providing messaging service to a different area. The controllers are responsible for scheduling messages including overhead messages for delivery to SMUs operating on their respective systems Controller (107) is shown coupled to a transmitter (111), such as the Nucleus II™ product available from Motorola, and this transmitter is coupled to antenna (113) and operates to transmit a signal on forward or outbound channel (115) to unit such as SMU (117) when they are within the service area of this transmitter or system. It is understood that FIG. 1 is an exemplary diagram only and that ordinarily controller (107) would be coupled to and control a multiplicity of transmitters. Transmitter (111) is further coupled, preferably to a GPS receiver (119), available from various manufacturers, that operates to receive a time reference from a GPS satellite and supply that reference to and maintain a time reference for the transmitter and outbound channel (115).

Controller (109) is shown coupled to transmitter (121), preferably a Nucleus II, and this transmitter is coupled to antenna (123) and operates to transmit a signal on forward or outbound channel (125) to units such as SMU (117) when they are within the service area of this transmitter or system. It is understood that FIG. 1 is an exemplary diagram only and that ordinarily controller (109) would be coupled to and control a multiplicity of transmitters. Transmitter (121) is further coupled, preferably to a UTC receiver (119), in practice another GPS receiver that together with transmitter (121) adds in a UTC offset, that operates to receive a time reference from a GPS satellite and supply that reference plus UTC offset to and maintain a UTC time reference for the transmitter and outbound channel (115). It is understood that other implementations for providing a UTC reference are readily available.

Other time references may be accommodated with the inventive principles discussed herein however GPS and UTC are the commonly used references. Additionally it is understood that the equipment referenced here will need to be modified and these modifications are within the abilities of one skilled in the art given the inventive principles disclosed herein.

Figure 2:
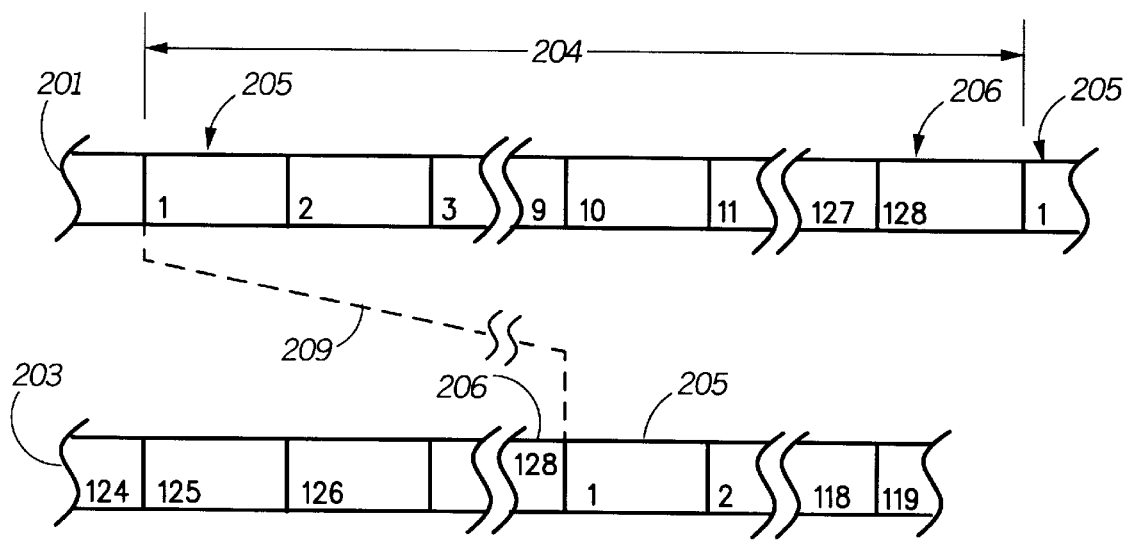
FIG. 2 is a representative protocol diagram for two operating channels scheduled according to different time references.

Referring to the diagram of FIG. 2 a description of an exemplary protocol will be undertaken pursuant to a clearer understanding of the full scope of the present invention. FIG. 2 depicts a channel protocol (201), such as would be observed by SMU (117) on outbound operating channel (115) and a further channel protocol (203) such as would be observed on outbound operating channel (125). The channel protocols are, respectively, scheduled in accordance with a GPS and UTC reference or time reference. These protocols are, preferably FLEX™ family protocols, such as the FLEX one way protocol or ReFLEX two way protocol that have been designed by Motorola.

The FLEX family protocols are characterized by repeating cycles (204) of 128 frames beginning with frame 1 (205) and ending with frame 128 (206). (Note: protocol specifications refer to these frames as frame 0 through frame 127). Each cycle has a time duration of 4 minutes and each frame is 1.875 seconds long. As depicted the UTC referenced channel or protocol is offset (209) or has a time offset from the GPS referenced channel or protocol by something more than 8 frames but less than 9 frames or approximately 16 seconds. These protocols include various overhead or system and channel information in prescribed frames, such as frame 1 (205) that repeat periodically.

Figure 3:
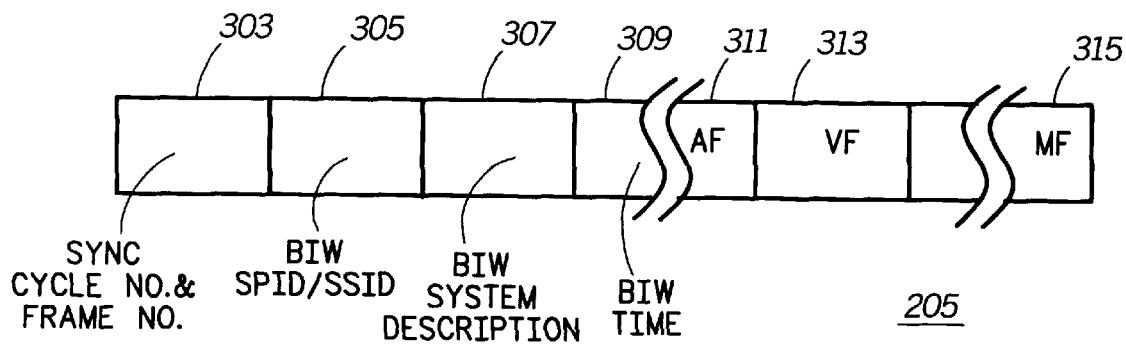
FIG. 3 is a more detailed protocol diagram of a first frame of the protocol of FIG. 2.

Referring to the diagram of FIG. 3 a detailed view of frame 1 (205) is depicted and will be discussed. This frame begins with a SYNC (303) that includes cycle number and frame number information and has a duration of, preferably 115 milliseconds. After the SYNC various block information words (BIW) are transmitted and these allow the communication of various system and channel information including neighboring channels or systems to the SMUs within the system or at least the SMUs that are equipped to interpret and act on the information transmitted. Shown is a Simulcast System Identifier/Service provider ID (SPID/SSID) (305) that provides country code and area code information, as well as, coverage zone data for a service provider. The SPID allows the selective messaging unit to identify, register with, and receive service from a particular service provider. This allows a selective messaging unit to identify a new system that may have a time reference differing from the system last monitored. The SSID is used by the selective messaging unit to determine whether a particular channel should be monitored in a simulcast system, and whether messages transmitted by that particular simulcast system should be decoded. Next is a BIW (307) devoted to providing system descriptions such as operating parameters, time offsets, and frequencies of neighboring channels that might be received by a SMU. Then a time BIW (309) that specifies the local time is depicted.

After the BIWs an address field (311) is encountered. SMUs are active during the address fields and a particular SMU will be active during it's prescribed address field and will find an address matching there own as well as a pointer to a location within the vector field (313) if a message is scheduled for that SMU. The vector field at the proper location will contain a pointer to a message field (315) where the message will be found. Note the message field may be in a different frame and on a different channel than the vector field depending on system loading and other scheduling vagueries not here relevant nor further explained.

Figure 4:
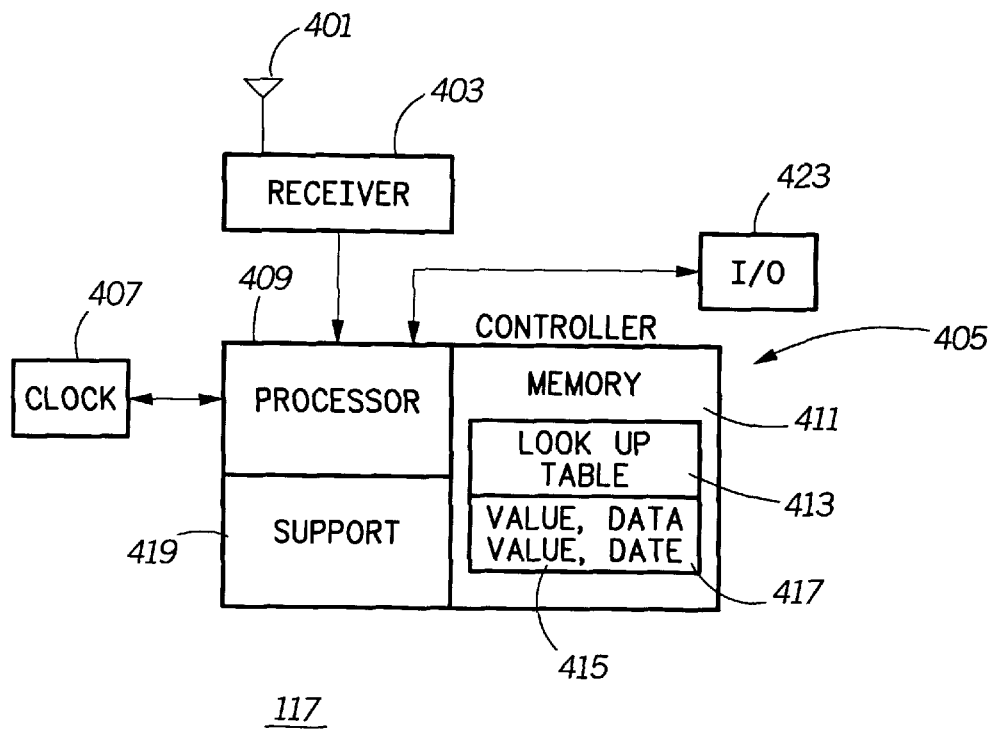
FIG. 4 is a block diagram of a preferred embodiment of a selective messaging unit suitable for use in the FIG. 1 messaging system.

For a clearer understanding of the inventive principles herein the block diagram of an SMU, such as SMU (117) depicted in FIG. 4 will be discussed. Such SMU are commonly called pagers and are available from Motorola. It is understood that ordinarily available SMUs will be modified in accordance with the principles discussed here by one skilled in art given such principles. The SMU includes an antenna (401) coupled to a receiver (403) that operate collectively to receive messages from an operating channel as is generally known. Coupled to the receiver is a controller (405) that interacts with and controls the receiver to program it for or tune it to the operating channel and decode messages received including overhead messages as known. The controller is further coupled to Input Output (I/O) (423), such as a display and push buttons that allow a user to interact with the SMU to manage the messages and SMU as known.

The controller (405) is inter-coupled with a clock (407) and when locked to a channel uses the SYNC information to adjust the clock or lock the clock of the SMU to the time reference of the channel. The controller is processor (409) based, preferably a 68300 series microprocessor from Motorola, that is inter-coupled with various support functions (419) and a memory (411) used to store operating software and parameters and further, preferably, includes a look up table (413) having time offset values (415) and associated dates (417) for the offsets between UTC and GPS referenced channels.

SMU (117) is arranged to reduce switching latency between operating channels that are scheduled in accordance with different time references and minimize battery consumption while so doing. In operation the receiver is utilized for monitoring a first operating channel scheduled in accordance with a first time reference and the controller, coupled to the receiver, is utilized for detecting or providing an indication corresponding to a second time reference and for controlling the receiver to scan for a second operating channel that is scheduled in accordance with the second time reference. Generally the SMU will either need to know that a neighboring system is available, for example by virtue of the BIWs on the channel being monitored, or alternatively know the time reference and proper offset and then look or scan for such a channel when the monitored channel is lost or the signal on that channel drops below a safe level as indicated by received signal strength or bit error rate.

In any event two circumstances are contemplated, one where the receiver monitors the first operating channel that is scheduled in accordance with a Global Positioning System (GPS) reference and the controller provides the indication that corresponds to a Universal Time Coordinated (UTC) reference. In this instance, the controller can provide the indication by decoding BIW (307), when available, for a system description corresponding to a UTC time referenced channel including the relevant offset. Alternatively the system description will provide a frequency of the second operating channel which from information in the controller memory is known to be UTC referenced.

The indication can be obtained or provided to correspond to local time. Ordinarily frame 1 of a UTC referenced cycle will start on the hour and in any event the local time will be an integer number of cycle durations for a UTC channel and a non integer number of cycles for a GPS referenced channel. In this instance the offset, from GPS to UTC referenced channels, may be determined by dividing the local time by the cycle duration, preferably 4 minutes, where the remainder of this division will be the offset for frame 1 of the UTC referenced channel. This remainder further divided by the frame length will give a resultant remainder that is the offset from the current GPS referenced frame to the beginning of the current UTC refrenced frame frame. One further alternative to determining the offset for a UTC channel is the look up table value and date stored in the memory, again when available.

The other circumstance contemplated by the present invention is where the receiver monitors the first operating channel scheduled in accordance with a Universal Time Coordinated (UTC) reference and the controller provides the indication corresponding to a Global Positioning System (GPS) reference. In this instance, preferably, the memory and look up table will store a value or offset value and associated or corresponding date corresponding to the GPS reference. Note: due to various apriori uncertainties the value for a particular date may be in fact two values in which case an SMU may be compelled to look in two temporal locations on some dates. Alternatively the relevant BIWs on the UTC referenced channel will include information sufficient to ascertain the same. These BIWs can be specified to include GPS time in addition to or instead of local time and, similar to above, the GPS time together with cycle time may be used to determine the relevant offset for the GPS referenced channel.

Figure 5:
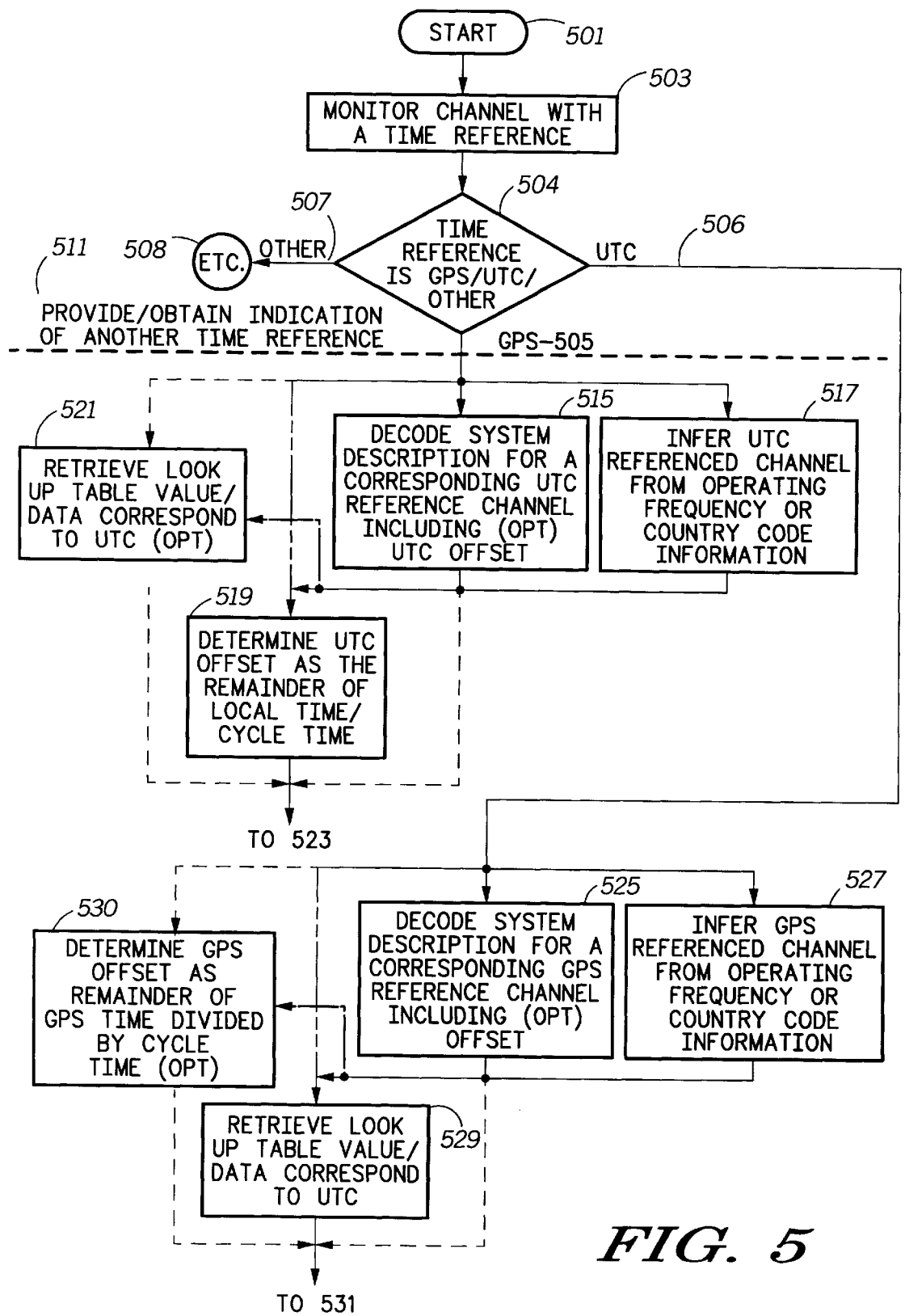
FIG. 5 is a flow chart of a portion of a preferred method embodiment in accordance with the present invention.
Figure 6:
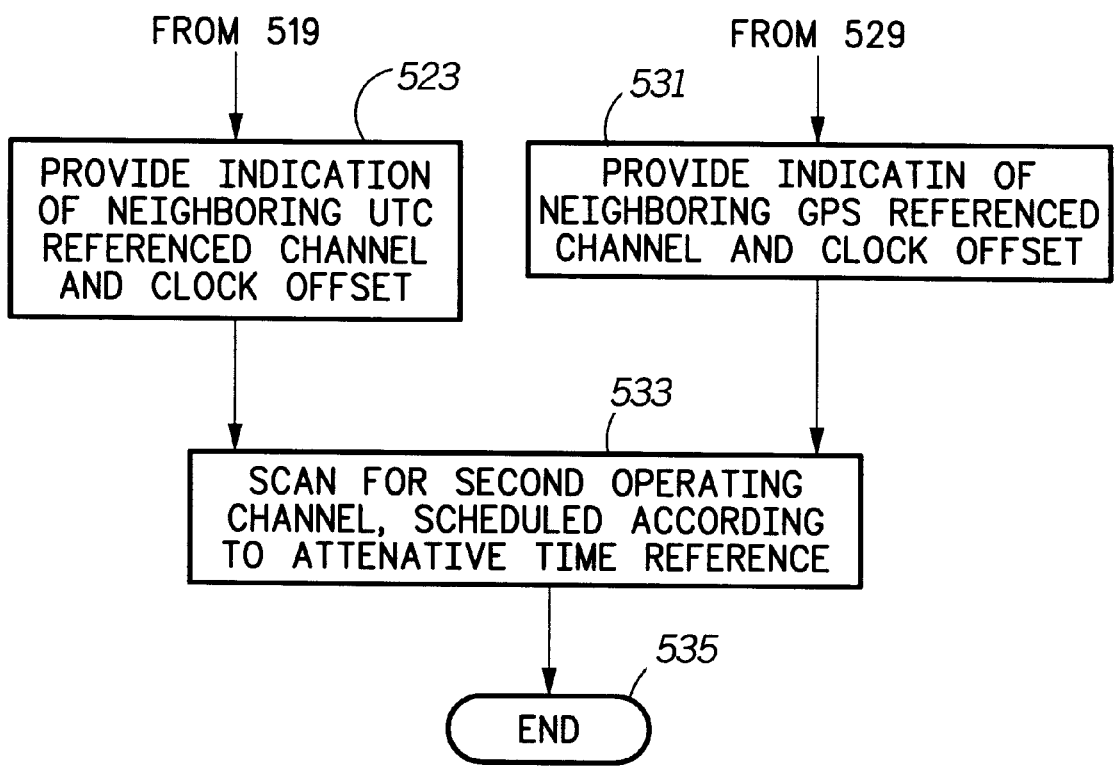
FIG. 6 is the balance of the FIG. 5 flow chart.

Referring to the flow chart of FIG. 5 asnd FIG. 6 a preferred method embodiment in accordance with the present invention will be discussed. The method begins at (501) and is set in a selective messaging unit. The method is a process of reducing switching latency between operating channels that are scheduled in accordance with different time references while conserving battery consumption for the SMU. At step (503), monitoring an operating channel that is scheduled in accordance with a first time reference occurs. Then step (504) tests whether the time reference is UTC (506), GPS (505), or another time reference (507). If another time reference, a corresponding strategy identified as etc. (508) would be followed. Otherwise Step (511) is executed thus providing or obtaining an indication corresponding to a second time reference. Given the indication step (533) scans for a second operating channel that is scheduled in accordance with the alternative or second time reference and the method ends at (535).

In more detail when step (504) determines that a GPS referenced channel is being monitored step (511) includes steps (515–523) which collectively determines or provides the indication corresponding to a Universal Time Coordinated (UTC) reference. Two types of information or indications are useful, one directed to knowing whether a UTC referenced channel is available as this will help avoid unnecessary scanning for such a channel and the other is the time offset to a UTC channel. More particularly the indication will correspond to a local time or system description, or operating parameter, such as frequency or country code or a look up table value.

Step (515) decodes a system description, when available on the channel protocol, corresponding to a UTC referenced channel and optionally the UTC offset. If the optional UTC offset is available the method proceeds to step (523). In parallel and additionally, step (517) uses operating frequency or country code information, from memory or over the air information, to infer that a channel is UTC referenced. Step (515 and 517) are both directed mainly to determining whether a UTC channel is available. Neither of these steps is essential to the method here but will add to the effectiveness of the method. Steps (515, 517) each feed, preferably, step (519) or optionally step (521).

Step (519) determines the UTC reference offset or time offset as the remainder of the local time divided by the cycle time, preferably 4 minutes, for the UTC referenced channel. This step is a straight forward approach for determinuing this offset. When steps (515, 517) are not available or alternatively unsuccessful step (519) may proceed directly from step (504) at (505). One alternative way of determining an offset is retrieving a value and corresponding date from a look up table as depicted in optional step (521). In any event after this step (523) provides an indication of a neighboring UTC referenced channel along with the appropriate clock offset to step (533)

If step (504) determines that a UTC channel is being monitored, step (511) includes steps (525–531). Step (515) decodes a system description, when available on the channel protocol, corresponding to a GPS referenced channel and optionally the GPS offset. If the optional GPS offset is available the method proceeds to step (531). In parallel and additionally, step (527) uses operating frequency or country code information to infer the a channel, from memory or over the air, is GPS referenced. Step (525 and 527) are both directed mainly to determining whether a GPS channel is available. Neither of these steps is essential to the method here but will add to the overall effectiveness. Steps (525, 527) each feed, preferably, step (529) or optionally step (530).

Optional Step (530) determines the GPS reference offset or time offset as the remainder of GPS time, when available, divided by the cycle time, preferably 4 minutes, for the GPS referenced channel. This step is a straight forward approach for determinuing this offset. When steps (525, 527) are not available or alternatively unsuccessful step (530 or 529) may proceed directly from step (504) at (505). One alternative and preferred way of determining an offset is retrieving a value and corresponding date from a look up table as depicted in step (529). In any event then step (531) provides a indication of neighboring GPS referenced channel and the clock offset for the step (533) scan.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. In a selective messaging unit a method of reducing switching latency between operating channels that are scheduled in accordance with different time references, the method including the steps of:

monitoring a first operating channel scheduled in accordance with a first time reference;

providing an indication corresponding to a second time reference; and scanning for a second operating channel that is scheduled in accordance with said second time reference.

2. The method of claim 1 wherein said step of monitoring further includes monitoring said first operating channel scheduled in accordance with a Global Positioning System (GPS) reference.

3. The method of claim 2 wherein said step of providing further includes providing said indication corresponding to a Universal Time Coordinated (UTC) reference.

4. The method of claim 3 wherein said step of providing further includes providing said indication corresponding to a local time.

5. The method of claim 3 wherein said step of providing further includes providing a system description corresponding to said UTC reference.

6. The method of claim 3 wherein said step of providing further includes providing a frequency of said second operating channel said frequency corresponding to said UTC reference.

7. The method of claim 3 wherein said step of providing further includes providing said indication corresponding to a look up table value.

8. The method of claim 1 wherein said step of monitoring further includes monitoring said first operating channel scheduled in accordance with a Universal Time Coordinated (UTC) reference.

9. The method of claim 8 wherein said step of providing further includes providing said indication corresponding to a Global Positioning System (GPS) reference.

10. The method of claim 9 wherein said step of providing further includes providing said indication corresponding to a look up table value.

11. The method of claim 10 wherein said step of providing further includes providing a look up table value corresponding to a date.

12. The method of claim 1 wherein said step of scanning is preceded by a step of determining an offset corresponding to said indication and a cycle time associated with said second operating channel.

13. The method of claim 12 wherein said step of determining further includes determining said offset to correspond to a Universal Time Coordinated (UTC) reference for said second operating channel.

14. The method of claim 12 wherein said step of determining further includes determining said offset to correspond to a Global Positioning System (GPS) reference for said second operating channel.

15. A selective messaging unit arranged to reduce switching latency between operating channels that are scheduled in accordance with different time references, the unit comprising in combination:

a receiver for monitoring a first operating channel scheduled in accordance with a first time reference;

a controller, coupled to said receiver,
for providing an indication corresponding to a second time reference; and
for controlling said receiver to scan for a second operating channel that is scheduled in accordance with said second time reference.

16. The selective messaging unit of claim 15 wherein said receiver further monitors said first operating channel scheduled in accordance with a Global Positioning System (GPS) reference.

17. The selective messaging unit of claim 16 wherein said controller further provides said indication corresponding to a Universal Time Coordinated (UTC) reference.

18. The selective messaging unit of claim 17 wherein said controller further provides said indication corresponding to a local time.

19. The selective messaging unit of claim 17 wherein said controller further provides a system description corresponding to said UTC reference.

20. The selective messaging unit of claim 17 wherein said controller further provides a frequency of said second operating channel, said frequency corresponding to said UTC reference.

21. The selective messaging unit of claim 17 further including a memory for storing a look up table value corresponding to said UTC reference.

22. The selective messaging unit of claim 15 wherein said receiver further monitors said first operating channel scheduled in accordance with a Universal Time Coordinated (UTC) reference.

23. The selective messaging unit of claim 22 wherein said controller further provides said indication corresponding to a Global Positioning System (GPS) reference.

24. The selective messaging unit of claim 23 further including a memory for storing a look up table value corresponding to said GPS reference.

25. The selective messaging unit of claim 24 wherein said memory further stores a date corresponding to said look up table value.

26. The selective messaging unit of claim 15 wherein said controller further determines an offset corresponding to said indication and a cycle time associated with said second operating channel.

27. The selective messaging unit of claim 26 wherein said controller further determines a Universal Time Coordinated (UTC) reference for said second operating channel.

28. The selective messaging unit of claim 26 wherein said controller further determines a Global Positioning System (GPS) reference for said second operating channel.

* * * * *